(12) United States Patent
Gaumnitz et al.

(10) Patent No.: US 10,872,075 B2
(45) Date of Patent: Dec. 22, 2020

(54) INDEXING FLEXIBLE MULTI-REPRESENTATION STORAGES FOR TIME SERIES DATA

(71) Applicant: SAP SE, Walldorf (DE)

(72) Inventors: Gordon Gaumnitz, Walldorf (DE); Lars Dannecker, Dresden (DE)

(73) Assignee: SAP SE, Walldorf (DE)

( * ) Notice: Subject to any disclaimer, the term of this patent is extended or adjusted under 35 U.S.C. 154(b) by 538 days.

(21) Appl. No.: 15/655,667

(22) Filed: Jul. 20, 2017

(65) Prior Publication Data

US 2019/0026329 A1   Jan. 24, 2019

(51) Int. Cl.
| | | |
|---|---|---|
| G06F 7/00 | (2006.01) | |
| G06F 16/23 | (2019.01) | |
| G06F 16/27 | (2019.01) | |
| G06F 16/22 | (2019.01) | |
| G06F 16/2455 | (2019.01) | |
| G06F 16/2458 | (2019.01) | |

(52) U.S. Cl.
CPC ...... *G06F 16/2365* (2019.01); *G06F 16/2272* (2019.01); *G06F 16/2477* (2019.01); *G06F 16/24568* (2019.01); *G06F 16/27* (2019.01)

(58) Field of Classification Search
CPC .......... G06F 16/2365; G06F 16/24568; G06F 16/27; G06F 16/2272; G06F 16/2477; G06F 16/2264; G06F 16/2228
See application file for complete search history.

(56) References Cited

U.S. PATENT DOCUMENTS

2015/0051967 A1\* 2/2015 Steuer ................ G06Q 30/0246
  705/14.45
2016/0328432 A1\* 11/2016 Raghunathan ...... G06F 16/2264

\* cited by examiner

*Primary Examiner* — Azam M Cheema
(74) *Attorney, Agent, or Firm* — Mintz Levin Cohn Ferris Glovsky and Popeo, P.C.

(57) ABSTRACT

Time series data may be represented with multiple representations, optionally using a variety of storage approaches, and the plurality of representations may be indexed using a representation index, which includes a start row identifier, a representation identifier, and an offset within the representation for each segment of one or more rows in the time series data column.

20 Claims, 9 Drawing Sheets

INDEXING FLEXIBLE MULTI-REPRESENTATION STORAGES FOR TIME SERIES DATA

TECHNICAL FIELD

The subject matter described herein relates to indexing of time series data, including time series data retained in flexible multi-representation storages.

BACKGROUND

In order to use flexible multi-representation storage for time series data, a database management system needs to quickly find, access and organize multiple representations for time series.

Time series analysis are data analysis techniques used as a basis for business planning and decision support in many application domains. There thus exists an ever-present interest in research and industry, to query, mine, and analyze time series. A task of time series analysis is to identify patterns, sequences, correlations, and characteristics within and between time series data, and to draw conclusions based on those observations. Due to recent developments in computer hardware and sensor technology there is an ever-increasing availability of continuous measurements recorded with sampling rates of up to MHz or higher. Such measurements generally result in fine grained time series, which can require substantial data volumes and data streaming frequencies.

SUMMARY

In one aspect consistent with implementations of the current subject matter, time series data in a time series data column are represented with a plurality of representations using at least two storage approaches, and the plurality of representations are indexed using a representation index, which includes a start row identifier, a representation identifier, and an offset within the representation for each segment of one or more rows in the time series data column. The representation index is accessed instead of the time series data column to perform one or more data operations.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a storage and access of time series data, it should be readily understood that such features are not intended to be limiting except to the extent such limitations are claimed. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A flexible approach for storing time series data may utilize multiple representations in order to achieve optimization among various storage approaches, which may include selection among parameters such as covered time period, compression technique, accuracy, persistence (storage medium), and memory consumption. A first possible aspect of such an approach may include the use of different representations for various portions of a time series along the time axis (horizontal). A first compression model, accuracy, and/or storage medium may store data occurring during one period in a time series, while a different compression model, accuracy, and/or storage medium stores data during another period. In another possible aspect of the flexible approach described herein, time series data over a same period may be saved in multiple representations using different compression models.

Furthermore, representations of the time series data may overlap. In other words, a same set of one or more rows of a column storing time series data may be represented in more than one representation. Time series data over a same period may be saved in multiple representations using different compression models, accuracy, and/or storage media. While increasing demands on memory, such as vertical storage can afford efficient access for specific purposes.

Storing time series data according to the approaches outlined above may be useful for applications such as data aging and the optimization of operator execution patterns. Multi-representation in this manner may be useful in combining benefits of different representations in order to achieve rapid execution together with lower memory consumption, requirements that may conflict in conventional approaches.

An in-memory time series database can be implemented via a column store approach in which data are stored in a columnar format. As noted above, compression of the data in these columns may be lossy (or not, depending on the implementation specifics of the database). Additionally, as noted above, different types of compression may be used for different sections of the time series data, and more than one representation may represent a given data value or part of a time series. For example, time series for a most recent day might be stored without compression while slightly less recent data (e.g. a most recent month minus a most recent day) might be stored with slightly more lossy compression (e.g. with 1% or less compression error) and older data might be stored with an even more lossy compression (e.g. with 10% or less compression error). In addition to variability in compression for time series data according to relative or absolute age of a time period represented, data of a certain age may be transferred to a different type of storage relative to newer data (e.g. data older than a certain age may be stored on hard disk, flash memory, etc., while newer data are retained in memory. Data stored in such a database may be updated, appended, or deleted (which respectively refer to changing a data value to a new value, adding one or more new data values to a column, and removing or invalidating a data value from the column).

Figure 1:
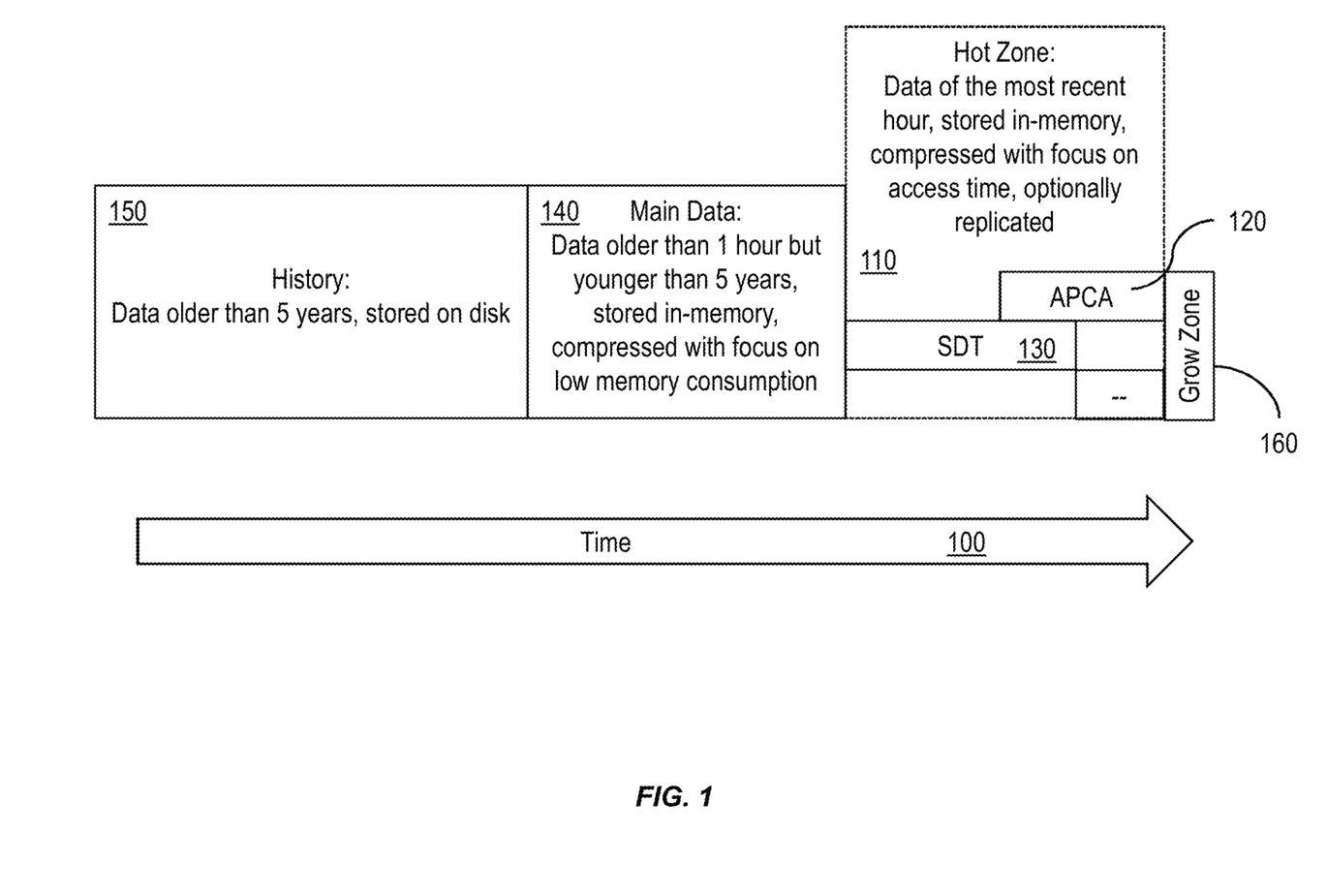
FIG. 1 shows a diagram illustrating use of different types of compression and data storage devices for time series data of different relative ages.

FIG. 1 illustrates an example of this potential variability in type of storage and compression depending on age of the data. A time axis 100 indicates older data to newer data from left to right. As noted above, data in a "hot zone" (which refers to most recent data, such as those data generated in the last hour or some other time period) 110 may be stored in memory with no or minimal compression, such as for example adaptive piecewise constant approximation (APCA) 120 or swing door trending (SDT) compression 130. An APCA compression technique partitions a time series into segments, where each segment approximates the contained variables by a constant function. The segment is created by determining a segment value and adding observations to this segment as long as the value complies with the defined error bound around the approximation constant. A SDT compression technique divides the time series into segments within which the values are approximated by a linear function. Values are added to the segment as long as the linear borders (the doors) jointly describe an angle of 180° towards their orthogonal connection at the first point. Both of these compression techniques are lossy. It will be understood that, while the examples discussed below refer to lossy compression techniques, lossless techniques such as run length encoding, etc. may also be used in conjunction with implementations of the current subject matter. The choice of compression type is does not limit the subject matter described herein except as explicitly expressed in the claims.

Referring again to FIG. 1, the "main data" 140 include (in this example) data older than 1 hour but younger than 5 years. It will be understood that main data 140 can be defined by any desired time limitations. Data in the main data 140 can be stored in-memory and compressed with a compression approach that emphasizes low memory consumption. Older data than those in the main data 140 can be stored as historical data 150 (referred to in FIG. 1 as "history"), which can be retained on disk rather than in-memory as access of such data may be assumed to be less frequently needed. Data in the hot zone 110 can be added to as new data are added, which is referred to in FIG. 1 as the grow zone 160. It will be understood that the specifics of how the time series is divided among multiple representations can vary depending on a given application or use case and is not intended to be limiting unless explicitly claimed in such a manner.

A compression technique may, in some examples of the current subject matter, be defined by features such as a reachable compression ratio, an allowable deviation from real values (i.e., approximation error), a compression/decompression speed, an execution speed of aggregation and analysis algorithms, etc. Apart from reduction of the used memory space, model-based compression techniques may also provide certain other benefits. First, they offer the potential to reduce the execution speed of standard aggregation operations. These include but are not limited to SUM, AVG, HISTOGRAM, STDDEV. As an example, for calculating the standard aggregation SUM given an APCA compression, running over segments is generally less expensive than scanning the entire time series column. However, the potential of a model-based compression technique to improve calculation speed depends upon the particular function. It will be noted that, as discussed above, representations may differ in other parameters than the compression approach (e.g. storage type, error bounds, etc.). Uses of one or more compression approaches to represent various segments of time series data (some of which may optionally overlap) are within the scope of the current subject matter. An illustrative example of the current subject matter relating to calculating of a sum is described below. It will be understood that other aggregation or calculation operations may also be performed using approaches consistent with the current subject matter that are understandable based on the explanations provided herein.

The current subject matter relates to various features that may be incorporated within a database management system storing data in a manner similar to that shown in FIG. 1 (e.g. using multiple representations) to improve operations of the database management system, for example via use of a representation index, which can provide one or more advantages, including improved processing speed for operations relating to finding relevant representations, faster performance using non-virtual operations on representations, faster performance of transaction aware inserts, updates, deletes, and upserts, where "upsert" can refer to inserting a new value at a certain time, if there is not yet a value previously denoted for this point in time, or, alternatively, to overriding the previously denoted value with the new value.

An input in the form of time series data can be received as some or part of a data column. An example of such an input is a raw time series data column 210 (or part of such a column) shown in FIG. 2. A time series can include one or more columns containing values, which can optionally include time values and/or other values such as sensor data, measurements, or the like. In general, a time series includes data representative of time, which can be represented in a variety of ways, such as for example with one or more columns containing time stamps, a date column in combination with a time column, a separated integer column (e.g. YYYY-MM-DD, DD-MMM-YYYY, hh-mm-ss, etc.), an incremental integer column (possible if the time stamps are separated by a regular period over at least some part of the time series data), etc. If there are multiple data columns, each such data column may include its own (e.g. possibly different than other columns) data type, such as for example, data from different types of measurements, text strings, etc. The time stamp column itself may also be represented consistent with the approaches described herein. Each column in a time series may optionally have its own set of representations and representation index.

A multi-column (e.g., multi-variate) time series generally includes all columns complying with a single time stamp column (although all of the columns need not have a data entry at every time stamp) having a same length (again, optionally with missing values for one or more time stamps in the time stamp column). Multi-representation storage may be applied per column, and there might be different horizontal and vertical configurations for different columns.

A storage engine or some other functionality may receive the time series data and may also receive one or more configuration inputs. Based upon these configuration inputs, the storage engine (or the like) generates from the time series data a time series storage that can include multiple representations of the time series data. Those multiple representations may be distributed on a horizontal (time) axis and/or a vertical (representation) axis.

A representation index consistent with implementations of the current subject matter can enable dynamic changes of a time series data representation, without changing the actual data. This approach can support abstract modifications such as update, append, and delete, as well as multi versioning. The approach can also enable storage of different parts of a column using different compressions and error thresholds. Existing solutions generally either focus on row-wise changes (e.g. via use of a change or delta log) or involve abstracting inhomogeneous access to the data without multi version control (e.g. via data source dispatching).

The following description relates to an illustrative example of some features of the current subject matter. In this example, data are loaded to a column-store data storage format. In some implementations of the current subject matter, the data can include "customer data" (e.g. data generated by one or more users of a database management system), which can optionally be provided in a comma separated value (CSV) format. The column store may be part of an in-memory database, which can optionally make use of an in-memory time series engine. The columnar data are split into different parts of the time series, which are referred to herein as "time series data representations." For brevity, a time series data representation may be referred to simply as a "representation." A representation can be defined by a data location (e.g. in-memory, distributed log, disk, archive, or the like), a compression type (e.g. Raw, APCA, SDT, or the like) used to compress the data, an error bound (e.g. expressed as a percentage of the values, an absolute amount, etc.), and a start-row-id. Optionally, an end-row-id can also be included (and the drawings submitted with this application show such a column to assist in understanding. However, the end-row-id is not essential as it can be interpreted that a segment ends at the row before a next segment begins. In other options, segments can have a set size such that each segment ends after a fixed number of rows following the start-row-id.

When accessing data in a column, for example as part of processing a query of time series data, relevant representations of the time series data may be identified. Parameters of the query generally define a start-time and an end-time. For a given time column, the start-row-id and end-row-id can be fetched. In general, time series data are sorted by time.

A representation index consistent with the examples described herein can be accessed using a start-row identifier. All rows in the index including and numerically greater than the start row having this start-row identifier are relevant. A representation can be identified with an representation identifier, and a relevant position within the representation can be identified with a help index (which may be referred to as an "inner offset") indicating the start of the portion within a given representation (e.g. the row in the representation index referred to) increased by the difference between the RowID of the specific row and the start-row-id. For example, the position within a representation can be calculated as the inner offset+(RowID−start_row_id).

Figure 2:
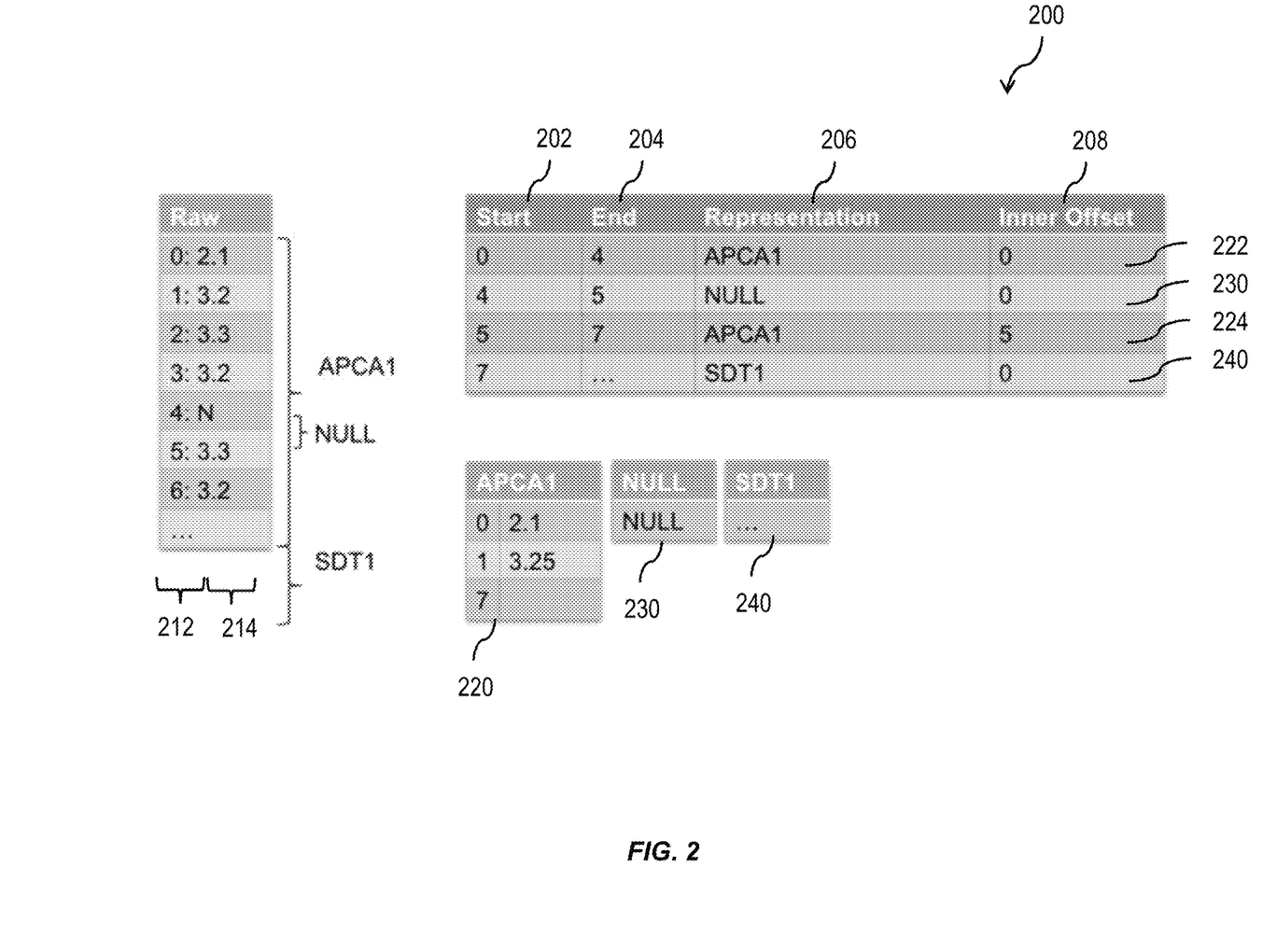
FIG. 2 shows a diagram illustrating features constituent with implementations of the current subject matter and relating to identifying representations within a column.

FIG. 2 shows an example representation index 200 that relates to example raw time series data column 210 and several representations 220, 230, 240 of one or more rows of those raw time series data column 210. The representation index 200 stores index information indicating how the raw data of the raw time series data column 210 are represented in the various representations 220, 230, 240. The representation index 200 includes a listing of segments of the raw time series data column 210, including columns listing a start row identifier 202, an end row identifier 204, an identification of the representation 206 used for the specific segment, and an inner offset 208 indicating where (e.g. at what row identifier) within the identified representation for the segment the segment begins, as described in more detail below.

The raw time series data column 210 includes row identifiers 212 and values 214. Referring to the simplified example of FIG. 2, rows with row identifiers 0 to 7 (with 7 excluded) are represented by a first representation 220 (labeled APCA1), which uses APCA compression, in which the first row (row identifier 0) is represented by the value 2.1 and the remaining rows (row identifiers 1, 2, 3, 4, 5, and 6) in the range are represented as the average of those rows (3.25). The range of rows with row identifier start value 4 and row identifier end value 5 (which corresponds to row identifier 4 per the start value being inclusive and end value being exclusive as discussed above) is represented by the second representation 230 (a "null" representation, occurring because row identifier 4 is lacking a value in the raw time series data column 210), which overrides the value of the first, ACPA representation for rows in the designated range, and rows with row identifiers of 7 and up in the raw time series data column 210 are represented by the third representation 240, which uses SDT compression. This example illustrates the use of overriding representations—the second representation 230, which applies to the range of row identifiers 4-5 (signifying row 4), overrides the APCA representation of row 4 to indicate that there is no data value in row 4. This approach reduces the need for two separate APCA-based representations (which would otherwise have to be used to represent the values respectively present in rows 0-3 and 5-6 of the raw data set 210). Because the second representation 230 (null) overrides and replaces part of the first representation 220 (APCA1), the first representation includes two segments, spanning row identifier ranges 0-4 and 5-7, respectively. The inner offset values for these first and second segments 222, 224 of the first representation 220 are indicated as 0 and 5, respectively, in the representation index 200.

Using the representation index 200 and the multiple representations 220, 230, 240 of FIG. 2 indexed by such a representation index 200, it is possible to perform various mathematical operations without requiring access to the raw time series data column 210. The following is a relatively simple illustrative example of such an operation, in which a sum is requested for values in rows 0 through 7. The ranges for the various representations spanning the rows to be operated on are fetched from the representation index for rows 0-7 as follows: rows 0-4 are represented as representation APCA1 starting at row 0 within the representation, rows 4-5 are represented as representation Null (as this representation overrides the APCA1 representation for row 4), and rows 5-7 are represented as representation APCA1 starting at row 6 within the representation. After fetching the representations, a pre-aggregation for each range (of rows represented in each representation) can be calculated. Referring again to the example of FIG. 2, the three ranges of rows in the target range of 0-7 have the following pre-aggregations: 1 *2.1+3*3.25=11.85 for the values in a first segment of the first (APCA1) representation 220 which includes rows 0-4, null for row 4-5 as represented in the second representation 230, and 2 *3.25=6.5 for the values in a second segment of the first (APCA1) representation 220 which includes rows 5-7.

A post-aggregation involving (in this case) summing of the values determined in the pre-aggregation results in 11.85+6.5=18.35 as the sum of the two non-null segments of the APCA1 representation 220 that are within the target range. Similarly, it will be understood that an average of the values in this range could be achieved by dividing by the number of non-null values, and other operations are also possible using approaches consistent with implementations of the current subject matter.

Figure 3:
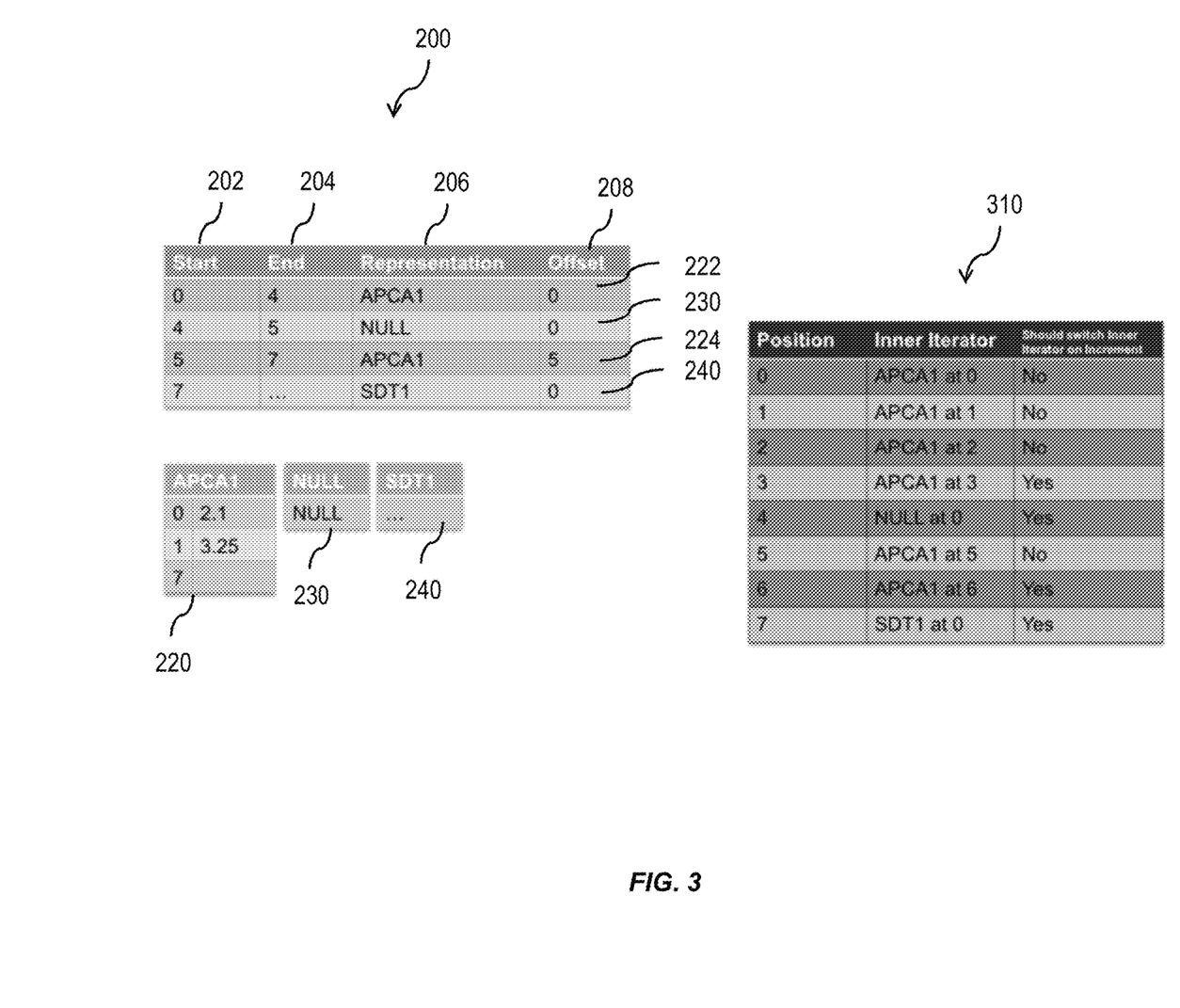
FIG. 3 shows a diagram illustrating features constituent with implementations of the current subject matter and relating to a column iterator.

Certain operations of the current subject matter can be implemented using an iterator, which can iterate the data in a timely ordered fashion. FIG. 3 illustrates features related to a column iterator, which can be used consistent with implementations of the current subject matter to materialize the data and/or any operation where it is not possible to identify a pre-phase and a post-phase for an algorithmic operation. An illustrative example of such a case is determining correlations between data.

Rather than having to materialize an entire set of data, the column iterator can perform whatever operations are needed to obtain one or more specific values of the raw data from the compressed data directly, by progressing through the data sequentially from the start of the raw time series data column 210 based on information in the representation index. The iterator operations list 310 of FIG. 3 illustrates how this can occur.

For the first three rows (0 to 2), the inner iterator knows from the representation index 200 that it should remain within the first representation 220 for the next value, because the representation index 200 start and end row identifier columns 202, 204 indicate that the first segment 222 has start and end row identifiers of 0 and 4, respectively. However, at row 3, the iterator is aware that the next row, with identifier 4, is within a different representation (the second representation 230). Likewise, as the start and end row identifiers for the second representation 230 indicate that row 5 is another representation shift point, the iterator knows from the representation index 200 that it must again switch the inner iterator on a row increment, this time to the second segment 224 of the first representation 220. At row 6, the iterator again knows that it must switch the inner iterator to another representation due to the indication in the representation index 200 that the second segment 224 of the first representation 220 ends before row 7.

A column iterator may follow a set of operations as follows. For example, the iterator may stay in its current RowID space as long as the next segment has a start row identifier that is greater than the current RowID. When a next segment is reached, the inner offset 208 (as discussed above) can be used to quickly jump into the next representation at the proper point. For a Null representation, null is returned for any row so represented. In this manner, the column iterator can progress through the raw time series data column 210 to identify needed values without requiring that the entire column be re-materialized.

Implementations of the current subject matter can also be beneficial in upsert (i.e. update or insert) operations performed on a raw time series data column 210. Updating or inserting of values (for example, value that were missing from a first input set of time series data or that need to be replaced with new values for some reason) can be accomplished by replacing one or more NULL areas, reducing the scope of one or more NULL areas (e.g. if there are partly filled areas), and/or by inserting additional representations.

An original representation index 200 can be re-used with modifications, for example after being copied to a new representation index 400 into which necessary changes are written, to represent revised data set upon application of one or more upsert (e.g. data modification) operations. The representation index 200 can require very little memory as the representation index 200 is generally not large compared to the data in the time series data column 210. In the example illustrated in FIG. 4, a new fourth representation 410 is added in which data are raw rather than compressed. In this example, the raw values of the fourth representation 410 replace the null value of row 4 (e.g. as an insert) with 3.5 and also update the previous value in row 5 (from the APCA value of 3.25 to 3.6), such that the fourth representation has a start row identifier of 4 and an end row identifier of 6.

Figure 4:
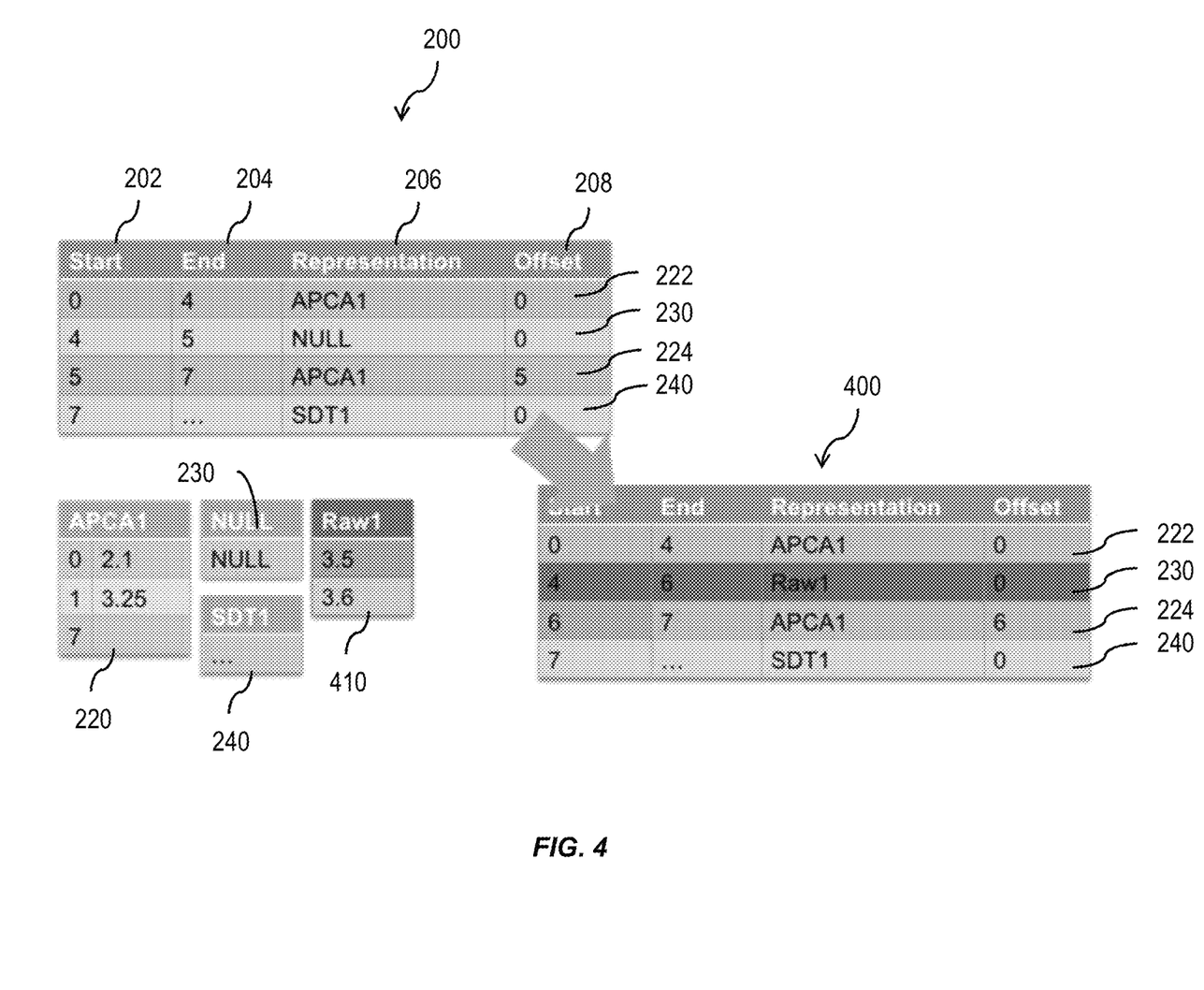
FIG. 4 and FIG. 5 show diagrams illustrating features constituent with implementations of the current subject matter and relating to data modification (e.g. insert or update or delete) operations.

This new representation is added to the new representation index 400. The offset for the start of the second segment 224 of the first representation 220 is also updated to reflect the change. The new representation index 400 can be committed and used for any transactions started after the upsert operation, and the original representation index 200 can be destroyed after a last (read) transaction begun before completion of the changes to the new representation index 400 has itself completed.

Figure 5:
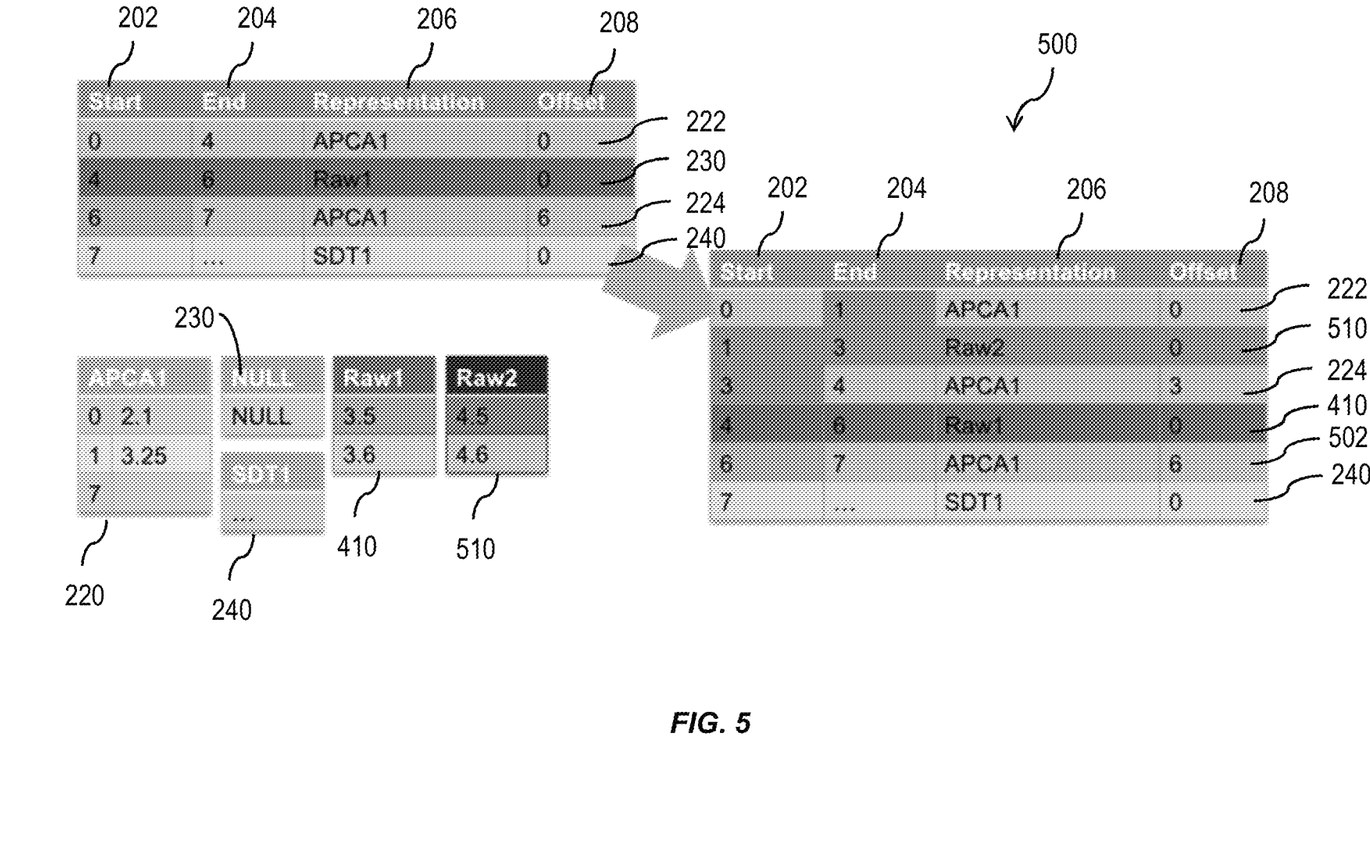

FIG. 5 illustrates a further upsert transaction, in which the new representation index 400 is copied to another new representation index 500. In this example, a new fifth representation 510 is added to represent the range with start row identifier 1 and end row identifier 3. This fifth representation 510 is labeled raw 2 as it is uncompressed like the fourth representation 410. This example also illustrates that additional lines can be inserted in the representation index 500 as necessary to indicate all of the representations being used to represent the data as further update and/or insertions occur. Here, the first representation 220 is now split into three segments 222, 224, 502 as a result of the inclusion of the new fifth representation 510 added to represent rows 1-3.

Figure 6:
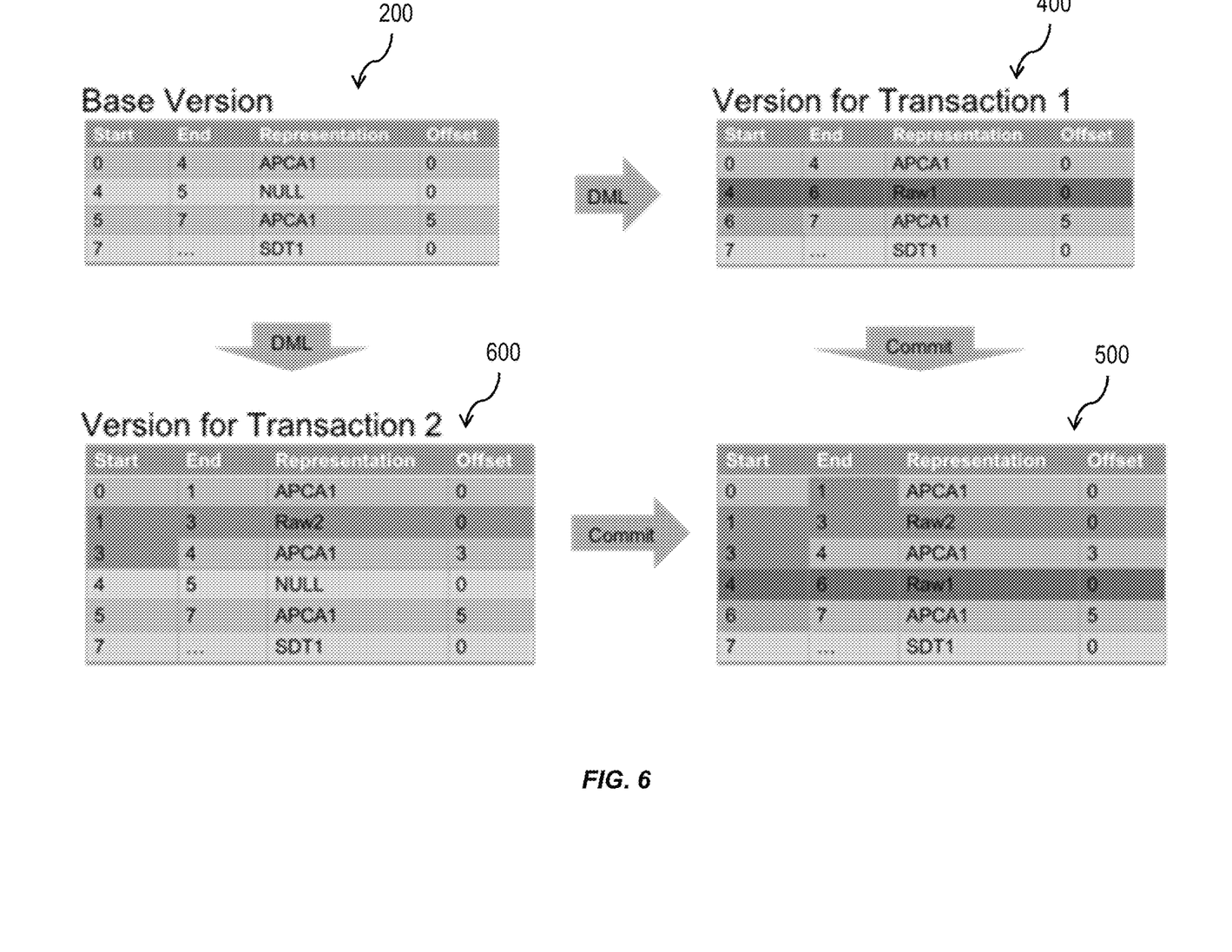
FIG. 6 shows a diagram illustrating features constituent with implementations of the current subject matter and relating to versioned updates.

FIG. 6 illustrates features of the current subject matter relating to versioned updates, which refers to two (or more) concurrent transactions occurring that require changes to a representation index 200. The example of FIG. 6 refers back to the two example upsert transactions discussed above in reference to FIG. 4 and FIG. 5 in the case in which the relevant transactions happen concurrently. Each transaction can operate on its own copy of the original representation index 200. The first transaction to add the fourth representation 410 results in the first new representation index 400, while the second transaction to add the fifth representation 510 results in the second new representation index 600. Upon the second transaction completing a commit requires merging of the two new representation indexes 400, 600. In the illustrated case, this can be done as there is no conflict such that the representation index 500 results. In the case of a conflict, the first committing transaction prevails. The second transaction would be aborted, and any changes made would be rolled back.

Figure 7:
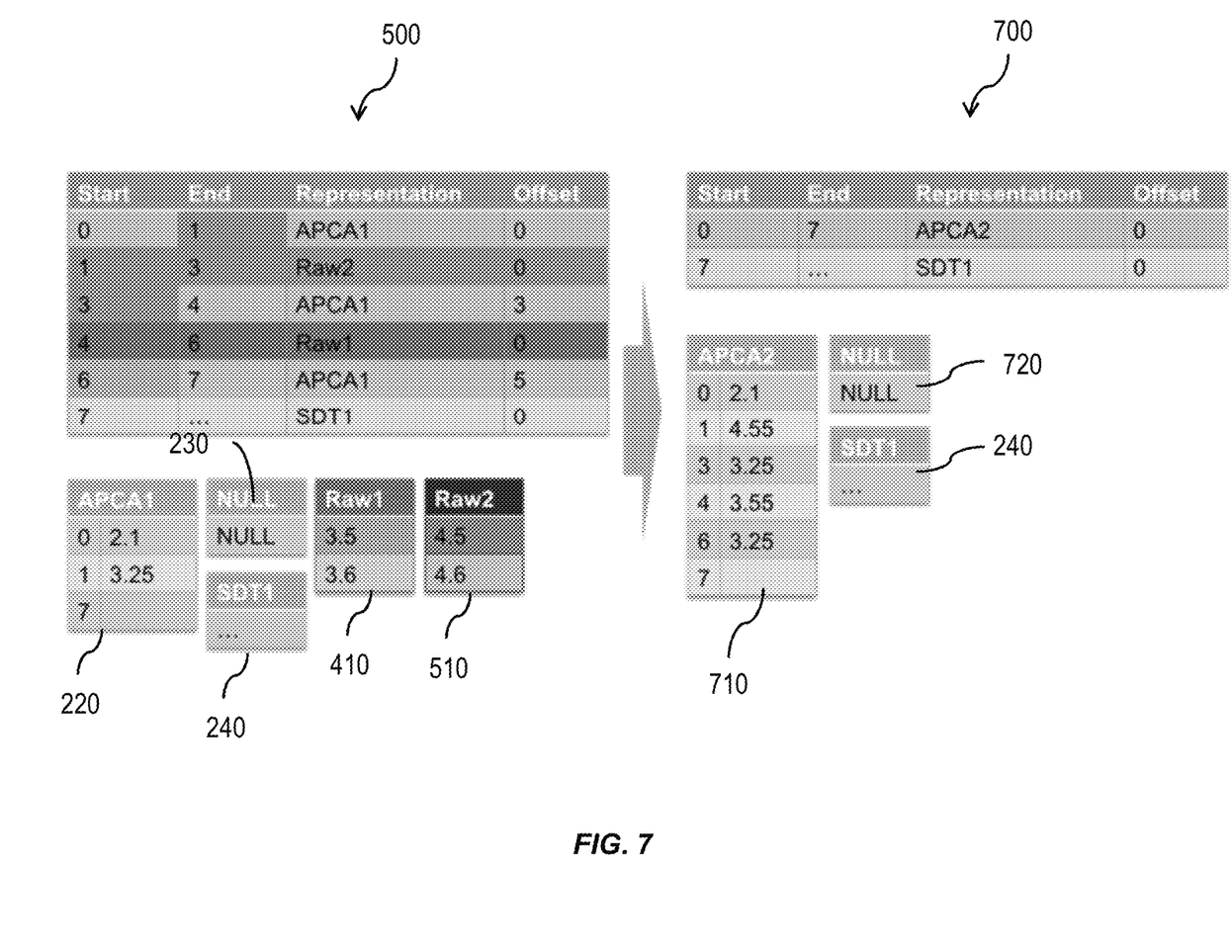
FIG. 7 shows a diagram illustrating features constituent with implementations of the current subject matter and relating to checkpointing.

FIG. 7 illustrates features of the current subject matter relating to checkpointing. As time goes on and more upsert transactions occur, the representation index can become increasingly complex with more and more individual segments. As the representation index grows in size and complexity, the system resources to process further transactions increases such that at some point it can be useful to recreate the representation index with fewer total representations. In other words, consistent with some implementations of the current subject matter, when a threshold number of individual representations are indexed in the representation index 500, the column can be checkpointed such that new representations are created to represent the time series data column with fewer total representations. In FIG. 7, the complex representation index 500 with five representations included can be simplified to the new representation index 700 with a new first representation 710 (APCA1 using APCA compression to represent rows in the range 0 to 7), the original third representation 240 (SDT1 using SDT compression), and a new null representation 720 which does not include any rows. Stated more generally, at least one new representation is created to replace two or more representations referenced by the representation index when the representation index exceeds a threshold number of lines.

Figure 8:
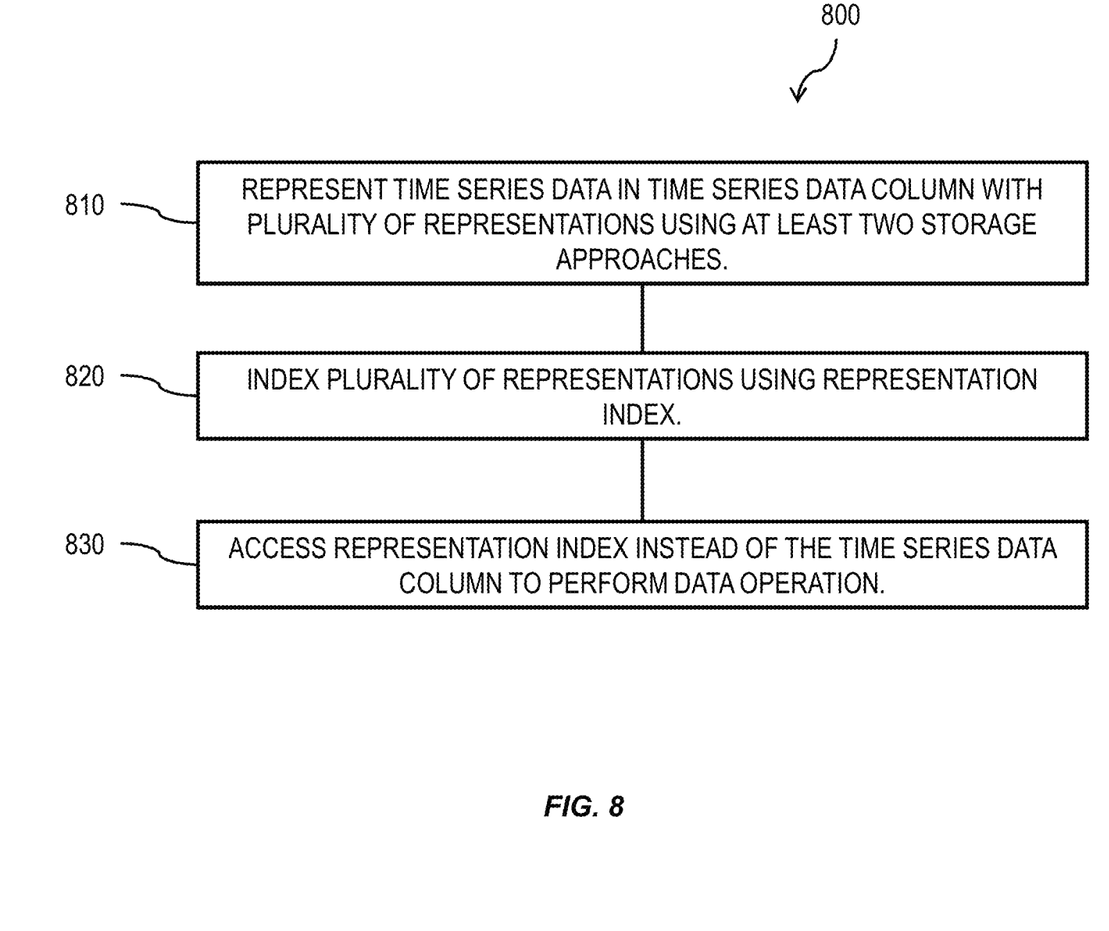
FIG. 8 shows a process flow diagram illustrating aspects of a method having one or more features consistent with implementations of the current subject matter.

FIG. 8 shows a recess flow chart 800 illustrating features which may be included in a method consistent with implementations of the current subject matter. At 810, time series data in a time series data column is represented with a plurality of representations using at least two storage approaches. The plurality of representations are indexed at 820 using a representation index. The representation index includes a start row identifier, a representation identifier, and an offset within the representation for each segment of one or more rows in the time series data column.

At 830, the representation index is accessed instead of the time series data column to perform a data operation. This accessing can include fetching the start row identifier, the representation identifier, and the offset from the representation index for each of one or more representations spanning a set of rows to be operated on. In turn, the one or more representations can be accessed based on the start row identifier, the representation identifier, and the offset. The data operation can include an update of a value in the time series data column, an insert of a value in the time series data column, and/or a deletion of a value in the time series data column. Optionally, at least one new representation can be created to replace two or more representations referenced by the representation index when the representation index exceeds a threshold number of lines.

When the data operation includes an update of a value in the time series data column, an insert of a value in the time series data column, and/or a deletion of a value in the time series data column, a copy of the representation index can be created, and the operation can further include adding one or more new lines to the copy of the representation index to reflect a new segment of one or more rows in the time series data column and/or deleting one or more existing lines from the copy of the representation index to reflect deletion of an existing segment one or more existing rows.

When the data operation comprises two (or more) concurrent data modification transactions, a first copy of the representation index is created for a first transaction of the two concurrent data modification transactions and a second copy of the representation index is created for a second transaction of the two concurrent data modification transactions. Additional copies of the representation index can be created for each additional transaction. For each transaction, at least one new line can be added to the representation index to reflect a new segment of one or more rows in the time series data column and/or at least one existing line can be deleted from the copy of the representation index to reflect deletion of an existing first segment comprising one or more existing rows. The first copy of the representation index and the second copy of the representation index (and any additional copies of the representation index if there are more than two concurrent data modification transactions) can be merged. The second transaction can be aborted when an attempt to merge the first copy of the representation index and the second copy of the representation index results in a conflict.

Figure 9:
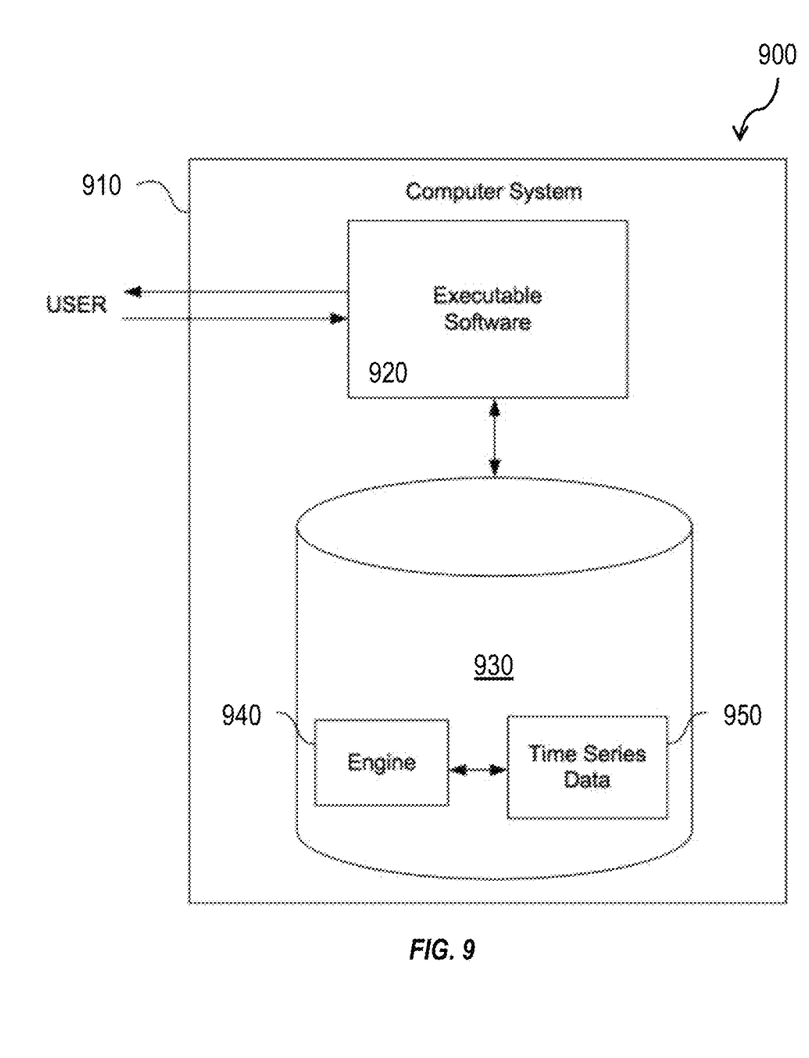
FIG. 9 shows a diagram illustrating aspects of a system showing features consistent with implementations of the current subject matter.

FIG. 9 shows a diagram of a computing system 900 that can be used in conjunction with one or more implementations of the current subject matter. Features described herein may be implemented by a database engine, such as an in-memory database engine. As shown in FIG. 9, hardware of a special purpose computing machine can be configured to provide multi-representation time series data storage and to implement a representation index consistent with implementations of the current subject matter. A computer system 910 can include a programmable processor 920 (which may include multiple programmable processors) in electronic communication with a non-transitory computer-readable storage medium 930. This computer-readable storage medium has stored thereon code 940, which may be executed by the programmable processor 920 to perform various operations described herein, which may include accessing time series data 950 stored in a database of a non-transitory computer-readable storage medium, for example as may be present locally or in a remote database server (not shown in FIG. 9). Software servers together may form a cluster or logical network of computer systems programmed with software programs that communicate with each other and work together in order to process requests One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network.

The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
    representing raw time series data in a time series data column with a plurality of representations of the raw time series data, wherein each of the plurality of representations refers to a storage approach of the raw time series data, wherein the plurality of representations comprise at least two storage approaches, wherein the at least two storage approaches comprise at least two different compression formats in which the raw time series data is stored;
    indexing the plurality of representations using a representation index, the representation index comprising, for each segment of the plurality of representations, a start row identifier, a representation identifier corresponding to a representation of the plurality of representations, an end row identifier, and an offset value, wherein the offset value indicates a relevant position within the representation of the plurality of representations where the segment begins, wherein each segment comprises one or more rows in the time series data column associated with the representation of the plurality of representations; and
    accessing the representation index instead of the time series data column to perform a data operation on the raw time series data.

2. The computer-implemented method of claim 1, wherein the accessing of the representation index comprises fetching, from the representation index, the start row identifier, the representation identifier, and the offset for each of one or more representations spanning a set of rows to be operated on, and accessing the one or more representations based on the start row identifier, the representation identifier, and the offset.

3. The computer-implemented method of claim 1, wherein the at least two storage approaches differ in two or more of compression, storage type, and approximation error.

4. The computer-implemented method of claim 1, wherein the data operation comprises an update and/or an insert of a value in the time series data column, and the method further comprises:
    creating a copy of the representation index; and
    adding one or more new lines to the copy of the representation index to reflect a new segment of one or more rows in the time series data column.

5. The computer-implemented method of claim 1, wherein the data operation comprises a deletion of a value in the time series data column and the method further comprises:
  creating a copy of the representation index; and
  deleting one or more existing lines from the copy of the representation index to reflect deletion of an existing segment one or more existing rows.

6. The computer-implemented method of claim 1, wherein the data operation comprises two concurrent data modification transactions, and the method further comprises:
  creating a first copy of the representation index for a first transaction of the two concurrent data modification transactions;
  adding at least one first new line to the representation index to reflect a first new segment of one or more rows in the time series data column and/or deleting at least one first existing line from the first copy of the representation index to reflect deletion of an existing first segment comprising one or more existing rows;
  creating a second copy of the representation index for a second transaction of the two concurrent data modification transactions;
  adding at least one second new line to the representation index to reflect a second new segment of one or more rows in the time series data column and/or deleting at least one second existing line from the second copy of the representation index to reflect deletion of an existing second segment comprising one or more existing rows.

7. The computer-implemented method of claim 6, further comprising merging the first copy of the representation index and the second copy of the representation index.

8. The computer-implemented method of claim 6, further comprising aborting the second transaction when an attempt to merge the first copy of the representation index and the second copy of the representation index results in a conflict.

9. The computer-implemented method of claim 1, further comprising creating at least one new representation to replace two or more representations referenced by the representation index when the representation index exceeds a threshold number of lines.

10. A computer program product comprising a non-transitory machine-readable medium storing instructions that, when executed by at least one programmable processor, cause the at least one programmable processor to perform operations comprising:
  representing raw time series data in a time series data column with a plurality of representations of the raw time series data, wherein each of the plurality of representations refers to a storage approach of the raw time series data, wherein the plurality of representations comprise at least two storage approaches, wherein the at least two storage approaches comprise at least two different compression formats in which the raw time series data is stored;
  indexing the plurality of representations using a representation index, the representation index comprising, for each segment of the plurality of representations, a start row identifier, a representation identifier corresponding to a representation of the plurality of representations, an end row identifier, and an offset value, wherein the offset value indicates a relevant position within the representation of the plurality of representations where the segment begins, wherein each segment comprises one or more rows in the time series data column associated with the representation of the plurality of representations; and
  accessing the representation index instead of the time series data column to perform a data operation on the raw time series data.

11. The computer program product of claim 10, wherein the accessing of the representation index comprises fetching, from the representation index, the start row identifier, the representation identifier, and the offset for each of one or more representations spanning a set of rows to be operated on, and accessing the one or more representations based on the start row identifier, the representation identifier, and the offset.

12. The computer program product of claim 10, wherein the at least two storage approaches differ in two or more of compression, storage type, and approximation error.

13. The computer program product of claim 10, wherein the data operation comprises an update and/or an insert of a value in the time series data column, and the method further comprises:
  creating a copy of the representation index; and
  adding one or more new lines to the copy of the representation index to reflect a new segment of one or more rows in the time series data column.

14. The computer program product of claim 10, wherein the data operation comprises a deletion of a value in the time series data column and the method further comprises:
  creating a copy of the representation index; and
  deleting one or more existing lines from the copy of the representation index to reflect deletion of an existing segment one or more existing rows.

15. The computer program product of claim 10, wherein the data operation comprises two concurrent data modification transactions, and the method further comprises:
  creating a first copy of the representation index for a first transaction of the two concurrent data modification transactions;
  adding at least one first new line to the representation index to reflect a first new segment of one or more rows in the time series data column and/or deleting at least one first existing line from the first copy of the representation index to reflect deletion of an existing first segment comprising one or more existing rows;
  creating a second copy of the representation index for a second transaction of the two concurrent data modification transactions;
  adding at least one second new line to the representation index to reflect a second new segment of one or more rows in the time series data column and/or deleting at least one second existing line from the second copy of the representation index to reflect deletion of an existing second segment comprising one or more existing rows.

16. The computer program product of claim 15, wherein the operations further comprise merging the first copy of the representation index and the second copy of the representation index.

17. The computer program product of claim 15, wherein the operations further comprise aborting the second transaction when an attempt to merge the first copy of the representation index and the second copy of the representation index results in a conflict.

18. The computer program product of claim 10, wherein the operations further comprise creating at least one new representation to replace two or more representations referenced by the representation index when the representation index exceeds a threshold number of lines.

19. A system comprising:
computer hardware configured to perform operations comprising:
representing raw time series data in a time series data column with a plurality of representations of the raw time series data, wherein each of the plurality of representations refers to a storage approach of the raw time series data, wherein the plurality of representations comprise at least two storage approaches, wherein the at least two storage approaches comprise at least two different compression formats in which the raw time series data is stored;
indexing the plurality of representations using a representation index, the representation index comprising, for each segment of the plurality of representations, a start row identifier, a representation identifier corresponding to a representation of the plurality of representations, an end row identifier, and an offset value, wherein the offset value indicates a relevant position within the representation of the plurality of representations where the segment begins, wherein each segment comprises one or more rows in the time series data column associated with the representation of the plurality of representations; and
accessing the representation index instead of the time series data column to perform a data operation on the raw time series data.

20. A system as in claim 19, wherein the computer hardware comprises
a programmable processor; and
a machine-readable medium storing instructions that, when executed by the processor, cause the at least one programmable processor to perform at least some of the operations.

* * * * *